E. HUBBACK.
HOISTING MECHANISM.
APPLICATION FILED NOV. 16, 1914.
1,138,873. Patented May 11, 1915.
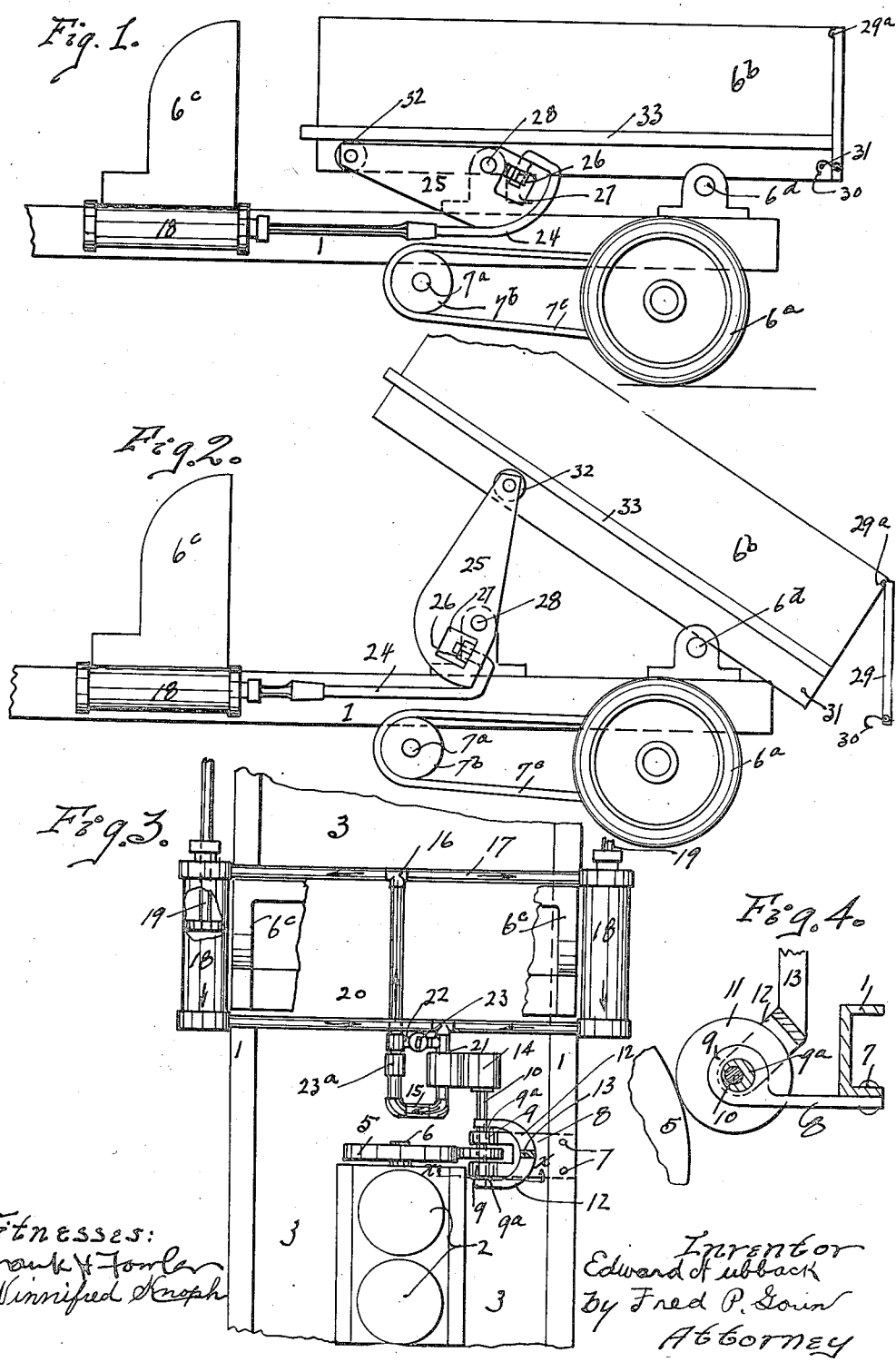

UNITED STATES PATENT OFFICE.

EDWARD HUBBACK, OF SEATTLE, WASHINGTON.

HOISTING MECHANISM.

1,138,873.

Specification of Letters Patent. Patented May 11, 1915.

Application filed November 16, 1914. Serial No. 872,340.

*To all whom it may concern:*

Be it known that I, EDWARD HUBBACK, a citizen of the United States, and a resident of Seattle, in the county of King and State of Washington, have invented certain new and useful Improvements in Hoisting Mechanisms, of which the following is a specification.

This invention relates to hoisting mechanisms, and more especially to such devices as are adapted for use in connection with the beds, or boxes, of motor trucks and the like, and has for its principal object to provide a power-operated device of this character by means of which a heavily loaded truck may be quickly and conveniently emptied of its contents.

Other objects will appear as the invention is more fully described and explained in the following specification, illustrated in the accompanying drawings and pointed out in the appended claims.

In the drawings, Figure 1 is a fragmentary side elevation of an automobile truck, with my device applied thereto. Fig. 2 is a similar view showing the truck bed in its operative position. Fig. 3 is a plan view of Figs. 1 and 2, with the rear portion broken away. Fig. 4 is an enlarged sectional view upon the line $x-x$ of Fig. 3.

Referring now more particularly to the drawings, reference numeral 1 designates the parallel side members of the chassis, or frame, of a motor truck: 2, its engine, which is supported upon the bed or floor 3 extending from one of the said side members to the other: 5, the fly wheel of the engine and 6, its shaft.

$6^a$ indicates the truck wheels: $6^b$ the box: $6^c$ the driver's seat, the said box being pivoted at $6^d$ to the truck frame.

$7^a$ is the countershaft: $7^b$ its sprocket wheel connected by means of a chain $7^c$ to the rear axle of the traction wheel. Secured to one of the said side members by any suitable means such as bolts indicated at 7, is a plate 8, extending upwardly from which are bearings 9, in each of which is a disk $9^a$ which is revoluble with respect to its bearing and which is eccentrically bored to receive the shaft 10: the said shaft, however, is concentric with the friction wheel 11 which is affixed to the said shaft. Affixed to the disks $9^a$ are the ends of a yoke 12 having an upwardly projecting handle, or lever, 13. The rear end of the shaft 10 is operatively connected to a pump, indicated at 14, which may be supported upon the bed 3 in any suitable manner, and connected with the said pump is a pipe 15 which passes to the rear, and, at 16, it is joined to a pipe 17 which extends athwart the truck frame, as best seen in Fig. 3. The pipe 17 connects the two cylinders 18, within each of which works a piston 19, and extending from one of the said cylinders to the other is a pipe 20. A short pipe 21 connects the said pump with the pipe 20 and a bypass 22 connects the pipe 21 with the pipe 15, there being a check valve, indicated at $23^a$, in the pipe 15, and a two-way cock, indicated at 23, in the bypass 22. To the rear end of each of the stems of the pistons 19 is connected one end of a flexible member of any suitable material, indicated at 24, the opposite end of which is passed around the heel of a lever 25 and secured thereto by passing the said flexible member through a suitable aperture in the edge of the said lever and fastening a nut 26 to the said flexible member, as seen in Figs. 1 and 2. The said lever may be cut away, as at 27, so that the said nut may be more easily manipulated. There are two of the levers 25, one upon each side of the truck frame, and each is pivoted at 28 with respect to the truck frame. The box $6^d$ may have a tailboard 29 hinged at $29^a$, and a hook 30 which is adapted to be engaged with a bolt, or pin, 31, to hold the tailboard in its closed position.

The cylinders 18, as well as all of the pipes above described, contain fluid, preferably oil, and normally the friction wheel 11 is out of engagement with the fly-wheel 5.

When it is desired to unload the truck all that is necessary is to first close the two-way cock 23, then move the free end of the lever 13 about its pivot, represented by the center of the disks $9^a$, so as to bring the friction wheel 11 into operative engagement with the fly-wheel 5, by which means, of course, the pump 14 is set in motion, which causes the fluid to pass through the pipe 15, in the direction indicated by the arrows, until it reaches the pipe 17, where the current of the fluid diverges, as indicated by the arrows along the pipe 17, which causes the pistons 19 to move forwardly and force the fluid in the same direction as indicated by the arrows upon the cylinders 18 and along the pipe 20. This forward movement of the pistons 19, through the flexible connections 24, causes the levers 25 to move about their respective pivots 28, until they finally assume their positions as seen in Fig. 2. This movement of the levers 25 elevates the forward end of the box 6ᵇ because the rollers 32, which are upon the ends of said levers, are in constant contact with the ledges 33 one of which is at each side of the said box, as will be understood. When the box 6ᵇ has been unloaded and it is desired to lower same to its normal position all that is necessary is to open the cock 23 in the bypass 22 and, by means of the lever 13, move the friction wheel 11 out of engagement with the fly-wheel 5, which stops the pump 14 and allows the box 6ᵇ to gravitationally descend.

While I have shown and described a particular form of embodiment of my invention, I am aware that many changes therein will readily suggest themselves to others skilled in the art without departing from the spirit and scope of my invention, and I therefore desire to avoid being limited to the exact form shown and described except as limited by the appended claims.

What I claim as new and desire to protect by Letters Patent is:—

1. In a device of the class described, the combination with a truck and its engine of a box pivoted to the truck frame, levers pivoted to the said frame and adapted to rotate the said box about its pivot, a heel upon each of the levers, flexible connections passed around the heels of the said levers and there secured, fluid operated pistons the ends of which are connected to the said flexible connections, a system of pipes and a pump for circulating the fluid therethrough, and operative connections between the said pump and the said engine.

2. In a device of the class described, the combination with a power truck, having a box pivoted to the truck frame, of a pair of levers pivoted to the frame of the truck and adapted to rotate said box about its pivot, a ledge upon each side of the said box and which is constantly in engagement with one of the said levers, a pump and a system of fluid containing pipes and cylinders connected thereto, the said pipes having a check valve and a two-way cock, pistons for the said cylinders, operative flexible connections between the said pistons and the said levers, means for operatively connecting the pump with the engine of the truck, said means including a friction wheel and an operating yoke and lever.

EDWARD HUBBACK.

Witnesses:
FRED P. GORIN,
WINIFRED KNOPH.